(12) United States Patent
Vaarkamp

(10) Patent No.: US 8,128,805 B2
(45) Date of Patent: Mar. 6, 2012

(54) CATALYST, CATALYST SUPPORT AND PROCESS FOR HYDROGENATION, HYDROISOMERIZATION, HYDROCRACKING AND/OR HYDRODESULFURIZATION

(75) Inventor: Marius Vaarkamp, Utrecht (NL)

(73) Assignee: BASF Corporation, Florham Park, NJ (US)

( * ) Notice: Subject to any disclaimer, the term of this patent is extended or adjusted under 35 U.S.C. 154(b) by 730 days.

(21) Appl. No.: 10/257,889

(22) PCT Filed: Apr. 18, 2001

(86) PCT No.: PCT/NL01/00308
§ 371 (c)(1),
(2), (4) Date: Feb. 5, 2003

(87) PCT Pub. No.: WO01/80996
PCT Pub. Date: Nov. 1, 2001

(65) Prior Publication Data
US 2003/0173252 A1 Sep. 18, 2003

(30) Foreign Application Priority Data
Apr. 20, 2000 (EP) .................................. 00201443

(51) Int. Cl.
*C10G 45/10* (2006.01)
*C10G 47/14* (2006.01)
*C07C 5/02* (2006.01)
*C07C 5/22* (2006.01)

(52) U.S. Cl. .................... 208/111.35; 208/108; 208/110; 208/111; 208/143; 208/210; 208/211; 208/216 PP; 208/216 R; 208/217; 585/275; 585/482; 585/671; 585/750; 502/63; 502/71; 502/77; 502/85

(58) Field of Classification Search .............. 208/217, 208/111.35, 108, 110, 111, 143, 210, 211, 208/216 PP, 216 R; 585/275, 482, 671, 750; 502/100, 64, 66, 84, 63, 71, 77, 85; 423/716
See application file for complete search history.

(56) References Cited

U.S. PATENT DOCUMENTS

| | | | | |
|---|---|---|---|---|
| 3,511,773 A | | 5/1970 | Addison et al. ............... 208/139 |
| 3,637,878 A | * | 1/1972 | Rowland ....................... 585/269 |
| 4,430,200 A | * | 2/1984 | Shihabi .................... 208/120.15 |
| 4,559,314 A | * | 12/1985 | Shihabi ........................... 502/71 |
| 4,790,929 A | * | 12/1988 | Speronello ............. 208/216 PP |
| 4,880,521 A | * | 11/1989 | Scherzer ................. 208/120.15 |
| 4,908,120 A | * | 3/1990 | Bowes et al. ................... 208/59 |
| 5,243,121 A | * | 9/1993 | Madon et al. ................. 585/649 |
| 5,259,946 A | * | 11/1993 | Robinson et al. ............... 208/65 |
| 5,346,612 A | * | 9/1994 | Kukes et al. .................. 208/143 |
| 5,593,570 A | * | 1/1997 | Habib et al. .................. 208/108 |
| 5,643,542 A | * | 7/1997 | Leyrer et al. ................. 423/212 |
| 5,756,420 A | * | 5/1998 | Wittenbrink et al. ......... 502/313 |

FOREIGN PATENT DOCUMENTS

| | | |
|---|---|---|
| GB | 1117210 | 6/1968 |
| WO | 9703150 | 1/1997 |
| WO | 9835754 | 8/1998 |
| WO | WO 98/35754 | * 8/1998 |

* cited by examiner

*Primary Examiner* — Prem C Singh
(74) *Attorney, Agent, or Firm* — Raymond F. Keller

(57) ABSTRACT

A catalyst for the hydrogenation, hydroisomerisation, hydrocracking and/or hydrodesulfurisation, of hydrocarbon feedstocks, the catalyst consisting of a substantially binder free bead type support material obtained through a sol-gel method, and a catalytically active component selected from precious metals, the support comprising 5 to 50 wt. % of at least one molecular sieve material and 50 to 95 wt. % of silica-alumina.

21 Claims, No Drawings

CATALYST, CATALYST SUPPORT AND PROCESS FOR HYDROGENATION, HYDROISOMERIZATION, HYDROCRACKING AND/OR HYDRODESULFURIZATION

The present invention is directed to a catalyst, a support for a catalyst and a process for hydrogenation, hydroisomerization, hydrocracking and/or hydrodesulfurization of a sulfur contaminants and optionally nitrogen contaminants containing feedstock.

When hydrogenation catalysts are used in the hydrogenation of petroleum distillates and derivatives thereof, often a problem presents itself in that the feed comprises as contaminants sulfur components and optionally nitrogen components, which adversely affect the life-time of the catalyst. In such processes conventional hydrogenation catalysts are usually applied, for instance supported nickel or platinum catalysts. To reduce this problem of deactivation much attention has been paid to the removal of at least part of the sulfur compounds from the gaseous or liquid feed prior to the hydrogenation. This method is also known as hydrodesulfurization (1IDS). Feeds containing sulfur contaminants may also contain nitrogen contaminants, which also can act as catalyst poison.

In general sulfur impurities are present in feeds as mercaptans or thiophenic compounds, more in particular thiophene, benzothiophene, dibenzothiophene, as well as substitution products thereof, which impurities can be converted to $H_2S$ and hydrocarbons using a sulfidized Co—Mo catalyst.

The $H_2S$ produced in the HDS process is generally in the gaseous phase and is usually adsorbed from the gaseous phase by the use of a suitable solvent or solvent mixture, and processed into elemental sulfur.

The liquid product stream obtained from the HDS process still contains some sulfur. Typical sulfur levels of these product streams from HDS-units range from 0.1 to 500 ppm.

When nickel is used as a catalyst in the subsequent hydrogenation step, the major part of the sulfur is taken up by the nickel. As a result, the nickel catalyst will be deactivated in the course of time.

Similar problems to those described above may occur in hydroisomerization processes of sulfur containing feedstocks, catalyzed by a metal catalyst on a support. In these processes, the carbon chain of a paraffin is converted into a different carbon chain having the same carbon to hydrogen ratio.

While the deterioration of nickel catalysts caused by sulfur poisoning is in practice an irreversible process, noble metal catalysts retain part of their activity in the presence of sulfur contaminants. The sensitivity of noble metals to sulfur is related to the properties of the support and the metal(s) used.

In U.S. Pat. No. 3,943,053 it has been proposed to use a catalyst of an alloy of platinum and palladium in a weight ratio of approximately 1:3 on a chlorinated alumina support for the hydrogenation of aromatics and olefins present in hydrocarbon fractions containing sulfur and nitrogen compounds. This catalyst was reported to decrease the amount of aromatics in an effluent by 66% compared to catalysts of the single metals.

The French patent application 2 569 995 describes the use of a catalyst based on vermiculite having a molar ratio of silica:alumina of at least 12:1 and a high specific surface area. The catalyst further comprises at least one metal or compound thereof chosen from Group VIII of the Periodic Table. The most preferred catalyst described in said French patent application comprises at least one oxide of a metal chosen from Group VIII of the Periodic Table in combination with at least one oxide of a metal chosen from Group VI of the Periodic Table on said vermiculite support.

In EP-A 540,123 extrudates of alumina, silica-alumina and zeolite have been described, having Pt and Pd deposited thereon. The activity of this material is limited.

The European patent application 0 669 162 discloses a catalyst for a process for reducing the aromatic content of a hydrocarbon stream. Said catalyst comprises a specific silica-alumina carrier on which one or more metals of Group VIII of the Periodic Table are deposited.

A disadvantage of this catalyst is that the specific silica-alumina carrier is obtained from a solution of an aluminum alcoholate and/or carboxylate and a silicon alcoholate and/or carboxylate. The use of these organic starting materials for preparing the carrier is environmentally unattractive. Furthermore, the preparation of the carrier involves the extrusion of a viscous paste, which is an additional process step.

In EP-A 582,347 a similar catalyst, having the same disadvantages has been proposed as hydroisomerisation catalyst. A particular disadvantage of this catalyst is the small pore size, 1-3 nm, making it rather less suitable for treatment of heavy feedstocks. Further no information is given about the behavior in an environment where sulfur contaminants are also present.

In WO-A 9835754 a considerable improvement of the prior art catalysts has been proposed. This document describes catalysts based on non-crystalline silica-alumina supports, prepared by sol-gel techniques, said techniques encompassing first preparing a sol of silica-alumina, which is then gelled by passing sol-droplets consecutively through an oil phase and an aqueous alkaline phase.

Other catalysts of platinum and palladium are disclosed in U.S. Pat. No. 5,308,814 and international patent application WO-A-94/19429. In the first document the disclosed catalyst is supported on a zeolite Y support and in the latter on a zeolite beta support.

Although the catalysts of noble metals, such as platinum, palladium, ruthenium, iridium and rhodium, on zeolite supports appear to be more active than those on e.g. alumina, they have some disadvantages. It was found that hydrogenation, hydroisomerization, hydrocracking and/or hydrodesulfurization using a catalyst based on platinum, palladium or a combination thereof on a zeolite support tends to become more difficult when the used feedstock is heavier. Furthermore, some of these zeolites are expensive materials, thus rendering the use of catalysts on these zeolite supports economically less attractive.

Even though some of the processes mentioned above provide for an improvement in the hydrogenation of sulfur contaminant containing feedstocks, there is still room for improvement, more in particular in the properties of the hydrogenated compounds and in terms of activity.

It is therefore an object of the invention to provide a novel catalyst for hydrogenation, hydroisomerization, hydrocracking and/or hydrodesulfurization of a sulfur and optionally nitrogen contaminant containing feedstock, said catalyst having a low sensitivity to poisoning by said contaminants.

It is a further object of the invention to provide a process for hydrogenation, hydroisomerization, hydrocracking and/or hydrodesulfurization of a sulfur contaminant containing feedstock, wherein a catalyst is used which has a high hydrogenation, hydroisomerization, hydrocracking and/or hydrodesulfurization activity.

Still another object of the invention is to provide a process for hydrogenation, hydroisomerization, hydrocracking and/or hydrodesulfurization of a sulfur contaminant containing feedstock, wherein both light and heavy feedstocks may be hydrogenated, hydroisomerized, hydrocracked and/or hydrodesulfurized.

Yet another object of the invention is to provide a process for hydrogenation, hydroisomerization, hydrocracking and/or hydrodesulfurization of a sulfur contaminant containing feedstock, which process combines the above objects in an optimal manner, i.e. wherein a catalyst having a well-balanced, fine-tuned profile of all the above desired qualities and characteristics is used.

The present invention is based on the surprising discovery, that the combination of a molecular sieve material (such as zeolites in the broadest sense of the term) and a non-crystalline silica-alumina in a substantially binder free support material, results in both an improvement of the activity of a precious metal catalyst and in an improvement in the performance of the catalyst, namely resulting in improved properties of the hydrogenated feedstock.

The present invention accordingly is directed to a Catalyst for the hydrogenation, hydro-isomerisation, hydrocracking and/or hydrodesulfurisation, of hydrocarbon feedstocks, said catalyst consisting of a substantially binder free bead type support material obtained through a sol-gel method, and a catalytically active component selected from precious metals, the support comprising 5 to 50 wt. % of at least one molecular sieve material and 50 to 95 wt. % of silica-alumina and up to 5 wt. % of binder. More in particular the support material is completely binder free.

Preferred embodiments have been defined in the dependent claims.

Compared to conventional materials that contain more than 20 wt. % or even up to 30 wt. % of binder material, the present invention provides for a substantial improvement. The absence of binder material results in a substantial increase in the number of catalytically active sites and thus in the loading of the reactor. Additionally it is to be noted that the activity per amount of precious metal is improved. Further, by using this combination of molecular sieve material and silica-alumina, it is possible to obtain hydrogenated feedstocks having improved properties such as diesel fuels with better cetane number. Generally, the cetane number of diesel can be improved by hydrogenating aromatic rings and/or by opening naphtenic rings. These improvements are even more pronounced in case use is made of sol-gel techniques, as defined herein, for the preparation of the support material.

An important advantage of the invention resides therein that the support of the catalyst consists of beads which have a much higher mechanical strength than the conventional extruded supports. At the same time, the activity of the noble metal of a catalyst which is used in a process according to the invention is about equal or higher compared to that of similar catalysts having comparable active noble metal surfaces, as defined by CO adsorption. In other words, according to the invention a higher activity per unit reactor volume is achieved when compared to the process disclosed in EP-A-0 540 123, while the same amount of catalyst is used.

The invention is further directed to a catalyst or catalyst support, consisting of a substantially binder free support material comprising 5 to 50 wt. % of at least one molecular sieve material and 50 to 95 wt. % of silica-alumina. This material may either be used as support for a catalytically active material, which support has acidic properties or as a catalyst for acid catalyzed reactions, such as isomerisation, alkylation or (de)hydration reactions in general. In this embodiment the material of the invention is characterized by the possibility to tune the acidity and the absence of binder, without the inherently expected problems of this absence.

The invention is also directed to a process comprising in its most general form reactions in which hydrocarbon feedstocks are hydrogenated or dehydrogenated. More in particular hydrocarbon feedstocks containing sulfur contaminants are reacted in the presence of hydrogen. An important class of these feedstocks is formed by the various sulfur containing petroleum distillates and derivatives thereof.

Typical feedstocks to be hydrogenated, hydroisomerized, hydrocracked and/or hydrodesulfurized in the process of the invention usually have a sulfur contaminant content of from 0.1 to 500 ppm, preferably from 0.1 to 300 ppm calculated as sulfur, based on the weight of the feedstock. Examples of such feeds are inter alia benzene, "white oils", gasoline, middle distillates, such as diesel and kerosene, solvents and resins. More in particular the process is to be used for hydrogenating aromatic compounds in these feedstocks, e.g. dearomatizing hydrocarbon feeds that may contain thiophenic sulfur contaminants and/or nitrogen containing contaminants.

Surprisingly, it has further been found that olefins in an aromatic feedstock may be selectively hydrogenated in a process according to the invention. Particularly when a catalyst comprising only palladium is used, this hydrogenation of olefins in an aromatic feedstock is highly efficient.

In a specific embodiment, the catalyst of the invention is combined with a nickel catalyst in accordance with the procedure described in international patent application WO-A-97/03150. In a process in accordance with this embodiment, a hydrocarbon feed containing sulfur contaminants is contacted with the catalyst of the invention prior to or simultaneously with contacting a nickel catalyst. In this manner, the sulfur resistance of a nickel catalyst is improved and a very long life-time is obtained.

The process according to the invention can be carried out in various types of reactors which are suitable for hydrogenation, such as solid bed reactors, fluid bed reactors, slurry-phase reactors, trickle-phase reactors and the like.

In different embodiments of the process of the invention modifications can be made in reactor configuration and process design, at least partly depending on the nature of the feed and the temperature required for the desired reaction.

The process conditions are the known ones used for the hydrogenation, hydroisomerization, hydrocracking and/or hydrodesulfurization of the feeds used.

The hydrogen (partial) pressure used for the hydrogenation, hydroisomerization, hydrocracking and/or hydrodesulfurization depends on the type of feed and is preferably of from 0.5 to 300 bar, more preferably of from 0.9 to 250 bar.

Generally suitable conditions for the process according to the invention further comprise temperatures between 50 and 450° C. and liquid hourly space velocities (LHSV) between 0.1 and 25 $h^{-1}$. Depending on the type of feedstock and the hydrogen partial pressure, the temperature can suitably be chosen within the said range. More in particular it is to be noted that hydrocracking requires the highest temperature range, i.e. up to 450° C., whereas for hydrodesulfurization temperatures up to 400° C. suffice. Hydrogenation and hydroisomerization can be performed using temperatures of up to 350° C.

Various heavier feeds, especially those containing sulfur compounds having a higher boiling point, such as benzothiophene, dibenzothiophene and substituted dibenzothiophenes, require a rather high temperature for the hydrogenation, with the result that the temperature to be used for the process corresponds to the temperature at which the catalytically active materials, more in particular platinum, palladium or combination thereof are most effective.

As has been mentioned above, an important aspect of the invention, leading to the advantageous process for hydrogenation, hydroisomerization, hydrocracking and/or hydrodesulfurization of a sulfur contaminant containing hydrocarbon feedstock, is the choice of a very specific catalyst. Thus, the invention also relates to a catalyst for use in a hydrogenation, hydroisomerization, hydrocracking and/or hydrodesulfurization process as described above.

According to a preferred embodiment of the invention the catalyst has a dispersion degree of at least 0.2. The dispersion degree as defined herein is an important aspect of the catalyst of this embodiment. The dispersion degree is defined as the ratio of the number of CO molecules adsorbed in the first pulse, determined as set forth hereinbelow, and the number of metal atoms present in the catalyst sample.

In the support an amount of molecular sieve material, generally a crystalline micro- or mesoporous material, such as zeolite, modified zeolite or aluminium phosphate, preferably a zeolite in acidic form, is present. The term zeolite or modified zeolite is used to indicate that not only the traditional zeolite materials based on Si and Al are encompassed, but also other materials, such as titanium based zeolites.

The amount of molecular sieve material can be between 5 and 50 wt. %, preferably between 15 and 40 wt. %. Suitable zeolites are the acidic zeolites, such as the acidic forms of Zeolite X, Y, β, MCM-41, ZSM-5, modifications thereof and the like. Other possible materials are the aluminium phosphates.

The silica-alumina present in the support of the catalyst according to the invention is non-crystalline, in contrast to the molecular sieve material, which is crystalline. Crystallinity is generally determined by X-ray diffraction. A non-crystalline silica-alumina (more in particular a non-zeolitic material) has an X-ray diffraction pattern, which does not exhibit any diffraction peaks with a width at half height less than 1.0 degree of arc (measured over the double diffraction angle).

The acidity of the silica-alumina/zeolite support can for example be measured using pyridine adsorption/desorption, as described in the Experimental part.

However, according to a preferred embodiment the material has acidic properties, more in particular a Brønsted acidity of at least 5 µmol/g, as defined in the experimental part. More in particular the lower limit is 25, most preferred 50 µmol/g.

In this regard it is to be noted that applying the catalytically active metal to the support does not have a large influence on the acidity, especially not at noble metal loadings below 2 wt. %.

The support of the catalyst is obtained by sol-gel techniques, which are highly attractive from an environmental point of view. These techniques are described in for instance EP-A-0 090 994 and comprise the dropwise addition of an aqueous sol of inorganic salts of aluminum and silicon, containing dispersed therein the molecular sieve material, through an oil-phase to an alkaline water phase. This way, homogeneous beads are obtained which have a uniform porosity.

An advantage of preparing the support in this specific manner is that beads are obtained without performing a separate shape forming step such as extrusion. Moreover, beads can be handled very conveniently and safely during loading and unloading of a reaction vessel and enable a very high degree of packing in a reaction vessel due to their nearly spherical shape.

Another advantage of preparing the support by this sol-gel preparation method is that the obtained support has a very high mechanic strength and gives rise to hardly any production of fines, if at all. Both the Bulk Crush Strength (BCS) and the Side Crush Strength (SCS) of the support have very high values.

In the British patent 790,476 a catalyst comprising platinum and/or palladium on a silica-alumina support, has been disclosed, which support may be obtained by a sol-gel technique. This catalyst is, however, a catalyst for a process of reforming hydrocarbon fractions. Also, the preparation of the silica-alumina support described in this document comprises the preparation of a silica support by a sol-gel technique, wherein the alumina is introduced later by an ion-exchange method or a subsequent impregnation step. The described preparation leads to a support having a smaller surface area than that of the support of the catalyst which is used in accordance with the present invention.

The silica-alumina support of the catalyst to be used in the present invention may have a surface area chosen in the range of from 25 to 1200 m$^2$/g, preferably in the range of from 25 to 1000 m$^2$/g. More preferably, the surface area of the support ranges from 200 to 1000 m$^2$/g. It was found that a support having a surface area falling within the specified ranges renders a catalyst the most active.

The average pore size (calculated from the pore volume (<60 nm) and the surface area (BET), assuming cylindrical pores) of the support of a catalyst used in a process according to the invention is preferably higher than 2.0 nm, more preferably higher than 2.5 nm. It has been found, that applying the metal component to the support does not significantly alter the average pore size.

According to the invention, the Si/Al atomic ratio is of from 1:10 to 200:1, preferably of from 1:10 to 100:1. It is most preferred to have a Si/Al atomic ratio of from 1:3 to 50:1. Within this range an optimal increase in activity is observed.

Preferably, the catalyst comprises at least 0.01, more preferably 0.01 to 5, and most preferably 0.1 to 2, weight percent of the noble metal, i.e. rhodium, ruthenium, iridium, platinum, palladium or a combination thereof, based on the weight of the catalyst.

The catalyst preferably comprises both platinum and palladium. In this preferred embodiment, the platinum and palladium used in the catalyst of the invention are preferably present in a weight ratio of from 10:1 to 1:10, more preferably of 5:1 to 1:5. It is remarked, that it is uncertain in which chemical form the metal is active. This may be the pure metal, but it is also possible that the metal sulfide, or a metal alloy, is at least partly responsible for the increase in the sulfur resistance.

The catalyst which is used in accordance with the invention can be prepared by applying the noble metal component on the support having the required characteristics. Examples of such preparations and the conditions thereof are known to the skilled person. The application of the active metal component and/or components or precursors thereof to the support material can be performed by means of impregnation, adsorption, ion-exchange, chemical vapor deposition (CVD) or precipitation, if necessary, followed by further treatment to convert the precursor to the actual catalyst.

The invention also encompasses the use of a non-crystalline, acidic support for improving the performance of a catalyst based on platinum, palladium or a combination thereof in hydrogenation, hydroisomerization, hydrocracking and/or hydrodesulfurization reactions of a sulfur contaminant containing feedstock.

EXPERIMENTAL

In order to obtain the data listed in the examples, the following methods were employed.

Acidity of Catalysts

Pyridine adsorption experiments were done in a diffuse reflectance high temperature chamber equipped with KBr windows(Spectra-Tech). The chamber was connected with a gas system so that gases can flow through the chamber and the chamber can be evacuated.

Samples were ground into a fine powder and put into an aluminum sample cup. The samples were first heated to 450° C. and held at 450° C. for at least 1 h while a flow of inert gas was led through the chamber. After cooling to ambient temperature, a pyridine inert gas mixture was led through the chamber for about 1 min. Subsequently, the pyridine flow was stopped, while the flow of inert gas continued and the system was kept in this mode for at least 1 h. Finally, the sample was heated to 180° C. in the flow of inert gas and held at 180° C. for at least 1 h, then cooled to room temperature. The amount of adsorbed pyridine on Brønsted and Lewis acid sites, was determined using the difference in the infrared spectra after the outgassing at 450° C. and desorbing the pyridine at 180° C., by making use of the corresponding pyrimidinium-band and pyridine Lewis acid band with known extinction coefficients.

Dispersion

The dispersion degree can be determined by measuring the amount of CO adsorbed on a sample in reduced form of the catalyst at 25° C. and a pressure of 1 bar as follows. A known amount of a sample of the catalyst is placed in a reactor and reduced with hydrogen at 200° C. After cooling in hydrogen to 25° C., the reactor is flushed with helium for at least 30 minutes. Subsequently, the helium stream is interchanged with six pulses of a known amount of CO and the concentration of CO is measured at the outlet of the reactor with a thermal conductivity detector. The amounts of catalyst and CO are chosen such that the catalyst is saturated with CO after the first pulse, the second through sixth pulse are used to verify this.

The upper limit for the dispersion degree corresponds to the theoretical number of CO atoms that can be bound to one noble metal (Pt, Ir, Ru, Rh or Pd) atom. For practical purposes a value of 1 is generally a suitable upper limit.

The invention is further elucidated on the basis of the following, non restrictive, example.

Catalyst Preparation

A support containing 30% zeolite Y by weight was prepared from zeolite HY powder and solutions of silica and aluminum-sulfate by an aqueous sol-gel technique. The thus obtained spheres are designated MVS052. Brønsted acidity of MVS052 was 312 μmol/g as determined by pyridine adsorption at RT and desorption at 180C. MVS052 was impregnated with an aqueous solution containing Pd and Pt. After drying and reduction a catalyst designated MVC069 was obtained. The Pd content was 0.89% by weight. The Pt content was 0.30% by weight. The dispersion degree was 0.23.

Hydrocarbon Conversion

MVC069 was loaded in a fixed bed reactor and contacted with a hydrocarbon stream at 50 bar total pressure, a reactor inlet temperature of 260° C., a LHSV of 1.5 1/h and a hydrogen GHSV of 750 1/h. The properties of the feed and the product are listed in the table.

|  | Feed | Product |
| --- | --- | --- |
| Sulphur [ppm] | 65 | 21 |
| Nitrogen [ppm] | 120 | 15 |
| Boiling range [° C.] [ASTM D 86] | | |
| 5% | 241 | 237 |
| 95% | 356 | 361 |
| Total Aromatics [%] | | |
| IP 391/95 | 30.0 | 17.8 |
| Mono | 20.6 | 16.6 |
| Di | 7.2 | 1.0 |
| Tri | 2.2 | 0.2 |
| Density [g/ml] | | |
| 15° C. | 0.8548 | 0.8445 |
| Cetane IP380 | 52.4 | 56.3 |

The invention claimed is:

1. Catalyst for the hydrogenation, hydro-isomerisation, hydrocracking and/or hydrodesulfurisation, of hydrocarbon feedstocks, said catalyst having a dispersion degree of at least 0.2, said catalyst consisting of a substantially binder free bead type support material obtained through a sol-gel method comprising an addition of an aqueous sol of inorganic salts of aluminum and silicon, comprising dispersed therein crystalline molecular sieve material, through an oil-phase to an alkaline water phase, and a catalytically active component selected from precious metals, the support consisting of 5 to 60 wt. % of at least one crystalline molecular sieve material and 40 to 95 wt. % of non-crystalline, non-zeolitic silica-alumina, the support having Bronsted acidity of at least 50 μmol/g, a surface area from 25 to 1200 m$^2$/g, and an average pore size of higher than 2 nm, and wherein the silica-alumina has an X-ray diffraction pattern, which does not exhibit any diffraction peaks with a width at half height less than 1.0 degree of arc (measured over the double diffraction angle).

2. Catalyst according to claim 1, wherein the support material consists of 10 to 50 wt. % of at least one molecular sieve material and 50 to 90 wt. % of non-crystalline, non-zeolitic silica-alumina.

3. Catalyst according to claim 1, wherein the non-crystalline, non-zeolitic silica-alumina in the support material is an acidic silica-alumina, which is obtained by sol-gel techniques and wherein the ratio of Si to Al is from 1:10 to 200:1.

4. Catalyst according to claim 1, wherein the molecular sieve material is selected from the group of zeolites and modified zeolites.

5. Catalyst according to claim 1, wherein the catalyst contains 0.01 to 5 wt. % of precious metal, calculated in the weight of the catalyst as catalytically active component.

6. Catalyst of claim 1, wherein the catalytically active component comprises at least one component selected from the group of platinum, palladium, ruthenium, iridium and rhodium.

7. Catalyst of claim 6, wherein the catalytically active component is selected from the group comprising platinum, palladium or combinations thereof.

8. Catalyst of claim 7, wherein the catalytically active component comprises platinum and palladium in a weight ratio of 10:1 to 1:10.

9. Bead shaped catalyst support or catalyst, obtained through sol-gel technique comprising an addition of an aqueous sol of inorganic salts of aluminum and silicon, comprising dispersed therein crystalline molecular sieve material, through an oil-phase to an alkaline water phase, consisting of a substantially binder free material consisting of 5 to 50 wt. % of at least one crystalline molecular sieve material and 50 to 95 wt. % of non-crystalline, non-zeolitic silica-alumina, the support or catalyst having Bronsted acidity of at least 50 µmol/g, a surface area from 25 to 1200m²/g, and an average pore size of higher than 2 nm, and wherein the silica-alumina has an X-ray diffraction pattern, which does not exhibit any diffraction peaks with a width at half height less than 1.0 degree of arc (measured over the double diffraction angle).

10. Catalyst support or catalyst according to claim 9, wherein the said material consists of 10 to 40 wt. % of at least one molecular sieve material and 60 to 90 wt. % of non-crystalline, non-zeolitic silica-alumina.

11. Catalyst support or catalyst according to claim 9, wherein the non-crystalline, non-zeolitic silica-alumina in the support material is an acidic silica-alumina, wherein the ratio of Si to Al is from 1:10 to 200:1.

12. Catalyst support or catalyst according to claim 9, wherein the molecular sieve materials is selected from the group of zeolites and clay minerals.

13. Process of hydrogenation, hydroisomerization, hydrocracking and/or hydrodesulfurization of a sulfur contaminant containing hydrocarbon feedstock, wherein the feedstock is contacted in the presence of hydrogen gas with the catalyst of claim 1.

14. The process of claim 13, wherein the hydrocarbon feedstock contains thiophenic sulfur contaminants.

15. The process of claim 13, wherein the sulfur contaminant containing hydrocarbon feedstock is selected from the group consisting of white oils, solvents, diesels or middle distillates, gasoline, resins and kerosine.

16. The process of claim 13, wherein the feedstock is a product from an upstream hydrodesulfurization unit.

17. The process of claim 13, wherein the feedstock is contacted with the catalyst at temperatures in the range of from 50 to 450° C.

18. The process of claim 13, wherein the feedstock is contacted with the catalyst under a hydrogen pressure of from 5 to 300 bar.

19. Process for the preparation of a catalyst or catalyst support according to claim 1, said process comprising the dropwise addition of an aqueous sol of inorganic salts of aluminum and silicon, containing dispersed therein the molecular sieve material, through an oil-phase to an alkaline water phase, recovering the material from the alkaline water phase, optionally followed by further treatment and applying a catalytically active component on the material.

20. Bead shaped catalyst support or catalyst consisting of a substantially binder free material consisting of 5 to 50 wt. % of at least one crystalline molecular sieve material and 50 to 95 wt. % of non-crystalline, non-zeolitic silica-alumina, the support or catalyst having Bronsted acidity of at least 50 mol/g, and wherein the silica-alumina has an X-ray diffraction pattern, which does not exhibit any diffraction peaks with a width at half height less than 1.0 degree of arc (measured over the double diffraction angle).

21. Catalyst for hydrogenation, hydro-isomerisation, hydrocracking and/or hydrodesulferisation, of hydrocarbon feedstocks, comprising the bead shaped catalyst support of claim 20, the catalyst having a dispersion degree of at least 0.2.

\* \* \* \* \*